(12) United States Patent
Kim

(10) Patent No.: US 12,103,531 B2
(45) Date of Patent: Oct. 1, 2024

(54) APPARATUS AND METHOD OF CONTROLLING NEUTRAL TRAVEL

(71) Applicants: HYUNDAI MOTOR COMPANY, Seoul (KR); KIA CORPORATION, Seoul (KR)

(72) Inventor: Jeong Kyun Kim, Ansan-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 277 days.

(21) Appl. No.: 17/902,320

(22) Filed: Sep. 2, 2022

(65) Prior Publication Data

US 2023/0373489 A1    Nov. 23, 2023

(30) Foreign Application Priority Data

May 19, 2022    (KR) .................. 10-2022-0061159

(51) Int. Cl.
| | |
|---|---|
| *B60W 30/18* | (2012.01) |
| *B60W 10/18* | (2012.01) |
| *B60W 40/06* | (2012.01) |
| *B60W 40/105* | (2012.01) |
| *B60W 50/14* | (2020.01) |

(52) U.S. Cl.
CPC ...... *B60W 30/18109* (2013.01); *B60W 10/18* (2013.01); *B60W 40/06* (2013.01); *B60W 40/105* (2013.01); *B60W 50/14* (2013.01); *B60W 2050/143* (2013.01); *B60W 2050/146* (2013.01); *B60W 2530/10* (2013.01); *B60W 2710/18* (2013.01)

(58) Field of Classification Search
CPC .......... B60W 30/18109; B60W 10/18; B60W 40/06; B60W 40/105; B60W 50/14; B60W 2050/143; B60W 2050/146; B60W 2530/10; B60W 2710/18; B60W 40/076
See application file for complete search history.

(56) References Cited

U.S. PATENT DOCUMENTS

2021/0016775 A1*    1/2021   Hayashi ................ B60W 10/02

* cited by examiner

*Primary Examiner* — Jacob M Amick
(74) *Attorney, Agent, or Firm* — MORGAN, LEWIS & BOCKIUS LLP

(57) ABSTRACT

A neutral travel control apparatus includes a brake unit used to brake a vehicle, and a neutral travel controller configured to control the brake unit so that the vehicle travels within a braking performance range by determining, based on vehicle information, a limit value of braking performance of the travelling vehicle, and comparing the limit value with an actual value of the travelling vehicle corresponding to the limit value. The limit value is a reference value for determining whether a travel state including an actual weight of the vehicle and a gradient ratio of a road exceeds the braking performance of the vehicle.

20 Claims, 9 Drawing Sheets

| WEIGHT AND VEHICLE SPEED / GRADIENT RATIO | | GRADIENT < -6% SECOND INSTANT=4 | -6% ≤ GRADIENT < -3% SECOND INSTANT=2 | -3% ≤ GRADIENT SECOND INSTANT=1 |
|---|---|---|---|---|
| Weight ≥ GVW FIRST INSTANT=2 | ~30KPH | 0.19g | 0.22g | 0.23g |
| | 30~50KPH | 0.12g | 0.17g | 0.18g |
| | 50~70KPH | 0g | 0.17g | 0.18g |
| | 70~90 KPH | -0.11g | 0.1g | 0.18g |
| | 90~95 KPH | -0.12g | 0.12g | 0.12g |
| | 95~ KPH | -0.15g | 0g | 0.1g |
| GVW > Weight ≥ 1/2 GVW FIRST INSTANT=1 | ~30KPH | 0.2g | 0.22g | 0.23g |
| | 30~50KPH | 0.13g | 0.17g | 0.18g |
| | 50~70KPH | 0g | 0.17g | 0.18g |
| | 70~90 KPH | -0.10g | 0.17g | 0.18g |
| | 90~95 KPH | -0.11g | 0g | 0.12g |
| | 95~ KPH | -0.12g | 0.11g | 0.1g |
| 1/2 GVW > Weight ≥ Kerb FIRST INSTANT=0 | ~30KPH | 0.2g | 0.23g | 0.24g |
| | 30~50KPH | 0.14g | 0.17g | 0.19g |
| | 50~70KPH | 0g | 0.17g | 0.19g |
| | 70~90 KPH | -0.1g | 0.16g | 0.18g |
| | 90~95 KPH | -0.1g | 0.12g | 0.13g |
| | 95~ KPH | -0.1g | 0g | 0.1g |

FIG. 8

| WEIGHT AND VEHICLE SPEED / GRADIENT RATIO | | GRADIENT < -6% SECOND INSTANT=4 | -6% ≤ GRADIENT<-3% SECOND INSTANT=2 | -3% ≤ GRADIENT SECOND INSTANT=1 |
|---|---|---|---|---|
| Weight ≥ GVW FIRST INSTANT =2 | ~30KPH | 4400J | 4000J | 3200J |
| | 30-50KPH | 4600J | 4200J | 3400J |
| | 50-70KPH | 4800J | 4400J | 3600J |
| | 70-90 KPH | 5000J | 4600J | 3800J |
| | 90-95 KPH | 5300J | 4800J | 4000J |
| | 95- KPH | 5500J | 5000J | 4500J |
| GVW > Weight ≥ 1/2 GVW FIRST INSTANT =1 | ~30KPH | 2500J | 2300J | 1500J |
| | 30-50KPH | 2700J | 2500J | 1700J |
| | 50-70KPH | 2900J | 2700J | 1900J |
| | 70-90 KPH | 3100J | 2900J | 2100J |
| | 90-95 KPH | 3300J | 3100J | 2300J |
| | 95- KPH | 3500J | 3300J | 2500J |
| 1/2 GVW > Weight ≥ Kerb FIRST INSTANT =0 | ~30KPH | 1500J | 1000J | 600J |
| | 30-50KPH | 1700J | 1200J | 800J |
| | 50-70KPH | 1900J | 1400J | 1000J |
| | 70-90 KPH | 2100J | 1600J | 1200J |
| | 90-95 KPH | 2300J | 1800J | 1400J |
| | 95- KPH | 2500J | 2000J | 1600J |

FIG. 9

APPARATUS AND METHOD OF CONTROLLING NEUTRAL TRAVEL

The present application claims priority to Korean Patent Application No. 10-2022-0061159 filed on May 19, 2022 the entire contents of which is incorporated herein for all purposes by this reference.

TECHNICAL FIELD

The present disclosure relates to an apparatus and method of controlling neutral travel, and more particularly, to an apparatus and method of controlling a vehicle that has started travelling in neutral or a vehicle travelling in neutral.

BACKGROUND

Commercial vehicles are vehicles used for commercial purposes. Commercial vehicles include transport vehicles such as buses that transport people and trucks that transport goods. Commercial vehicles generally have a large weight. Accordingly, braking is difficult when travelling at high speed, so an accident is highly likely to occur. For example, since a bus has a large number of passengers, even a single accident may injure many people. In addition, when an accident occurs, a secondary explosion or the like may occur in a commercial vehicle that transports chemicals such as ignitable substances, explosive substances, inflammable substances, or heavy goods such as steel sheets and steel sheet coils. Commercial vehicles cause large losses even in a single accident, so commercial vehicles have a maximum speed limit separately from general vehicles. In some countries, it is mandatory to install a speed limiter for trucks or buses that exceed a predetermined weight. In some cases, speed limiters are attached to vehicles other than commercial vehicles for similar reasons to those of commercial vehicles.

A speed limiter controls the fuel supply to limit the maximum speed that the vehicle can reach. A vehicle equipped with a speed limiter cannot exceed the speed limit due to the speed limiter when travelling on flat ground. However, when a vehicle travels on a downhill road with the gears placed in neutral (N) state, there is an issue in that the vehicle may travel beyond the speed limit despite the speed limiter.

SUMMARY

In order to address the above-described issues, an aspect of the present disclosure provides an apparatus and method capable of controlling neutral travel of a vehicle.

According to an aspect of the present disclosure, provided is a neutral travel control apparatus including a brake unit configured to brake a vehicle, and a neutral travel controller configured to control the brake unit so that the vehicle travels within a braking performance range by determining, based on vehicle information, a limit value of braking performance of the travelling vehicle, and comparing the limit value with an actual value of the travelling vehicle corresponding to the limit value. The limit value may be a reference value for determining whether a travel state including an actual weight of the vehicle and a gradient ratio of a road exceeds the braking performance of the vehicle.

The limit value may be determined as a limit acceleration of the vehicle or limit braking energy of the vehicle based on one or more values of the actual weight, a travel speed, and a travel acceleration of the vehicle, and the gradient ratio of the road on which the vehicle is travelling.

The limit value may be determined based on a table including a first constant set and a second constant set and the travel speed of the vehicle, wherein the first constant set represents a range of the actual weight of the vehicle the second constant set represents a range of the gradient ratio of the road on which the vehicle is travelling.

The neutral travel control apparatus may further include a display unit configured to display an operating state of the vehicle using at least one of a display and a sound. When a driver changes a speed change gear from a drive (D) state to a neutral (N) state, the neutral travel controller may be configured to transfer, to a driver, a guidance message for verifying whether to change to the N state through the display unit, and to maintain the D state until receiving a response to verify the change to the N state.

The brake unit may include a main brake unit and an auxiliary brake unit. When an actual value of the vehicle exceeds the limit value, the neutral travel controller may be configured to decelerate the vehicle using at least one of the main brake unit and the auxiliary brake unit until the travel speed is reduced to be less than or equal to a predetermined speed.

The neutral travel controller may be configured to decelerate the vehicle using the auxiliary brake unit first before using the main brake unit.

The neutral travel control apparatus may further include a speed change gear unit configured to change a gear of the vehicle. When a brake state of the auxiliary brake unit has a value greater than or equal to an auxiliary brake set value, the neutral travel controller may be configured to control the speed change gear unit to automatically shift from an N state to a D state.

When a brake state of the auxiliary brake unit has a value greater than or equal to an auxiliary brake set value, the neutral travel controller may be configured to control the main brake unit to decelerate the vehicle until the travel speed is reduced to be less than the predetermined speed.

The auxiliary brake unit may include a retarder brake. The neutral travel controller may be configured to perform braking while increasing braking force of the retarder brake, and to decelerate the vehicle while increasing braking force of the main brake unit when the braking force of the retarder brake has a value greater than or equal to the auxiliary brake set value.

The auxiliary brake unit may include an engine brake. The neutral travel controller may be configured to change a speed change gear of the vehicle to a D state, and then perform braking while increasing braking force of the engine brake, and to decelerate the vehicle while increasing braking force of the main brake unit when the braking force of the engine brake has a value greater than or equal to an auxiliary brake set value.

When the actual value of the vehicle exceeds the limit value, the neutral travel controller may be configured to warn at least one of a driver of the vehicle and an exterior of the vehicle that the vehicle is travelling in neutral.

The neutral travel controller may be configured to i) receive a signal from a transmission gear shift lever of the vehicle, or ii) determine whether the vehicle is travelling in neutral by comparing a first speed detected using a vehicle speed sensor or a third speed detected using revolutions per minute (RPM) of a speed change gear output shaft with a second speed calculated using engine RPM.

The neutral travel controller may be performed when a travel speed exceeds a low-speed allowable speed.

According to another aspect of the present disclosure, provided is a neutral travel control method including determining, based on vehicle information, a limit value for braking performance of a vehicle, and neutral travel controlling of comparing the limit value of the vehicle with an actual value of the travelling vehicle corresponding to the limit value, and controlling a speed of the vehicle using a brake unit of the vehicle. The limit value may be a reference value for determining whether a travel state including an actual weight of the vehicle and a gradient ratio of a road exceeds the braking performance of the vehicle.

The limit value may be determined as a limit acceleration of the vehicle or a limit energy value of the vehicle based on one or more values of the actual weight, a travel speed, and a travel acceleration of the vehicle, and the gradient ratio of the road on which the vehicle is travelling.

The limit value may be determined based on a table including a first constant set and a second constant set and the travel speed of the vehicle, wherein the first constant set represents a range of the actual weight of the vehicle the second constant set represents a range of the gradient ratio of the road on which the vehicle is travelling.

The neutral travel controlling may further include transferring, to a driver, a guidance message for verifying whether to change to an N state using a display or a sound when a driver changes a speed change gear from a D state to the N state, and maintaining the D state until receiving a response to verify the change to the N state.

The neutral travel controlling may further include decelerating the vehicle using the brake unit including a main brake unit and an auxiliary brake unit until a travel speed is reduced to be less than a predetermined speed when the actual value of the vehicle exceeds the limit value.

The neutral travel control method may further include warning at least one of a driver of the vehicle and an exterior of the vehicle that the vehicle is travelling in neutral when the actual value of the vehicle exceeds the limit value.

The neutral travel controlling may further include performing neutral travel control when a travel speed of the vehicle exceeds a low-speed allowable speed.

According to example embodiments of the present disclosure, a vehicle travelling in neutral may be controlled to prevent speeding, thereby securing vehicle driving stability and preventing accidents caused by speeding.

In addition, according to example embodiments of the present disclosure, it is possible to notify a driver of a vehicle adjacent to the vehicle travelling in neutral that the vehicle travelling in neutral is not travelling normally, thereby inducing defensive driving and preventing an accident.

In addition, according to example embodiments of the present disclosure, it is possible to limit an N-state accelerating travel on a downhill road, and the like, thereby preventing a gear from being damaged due to a load acting abruptly when shifting from an N state to a D state during high-speed travel, and improving durability.

BRIEF DESCRIPTION OF DRAWINGS

The above and other aspects, features, and advantages of the present disclosure will be more clearly understood from the following detailed description, taken in conjunction with the accompanying drawings, in which:

FIG. 8 is a table illustrating a table for determining a limit value according to an example embodiment of the present disclosure; and FIG. 9 is a table illustrating a table for determining a limit value according to another example embodiment of the present disclosure.

DETAILED DESCRIPTION

Figure 1:
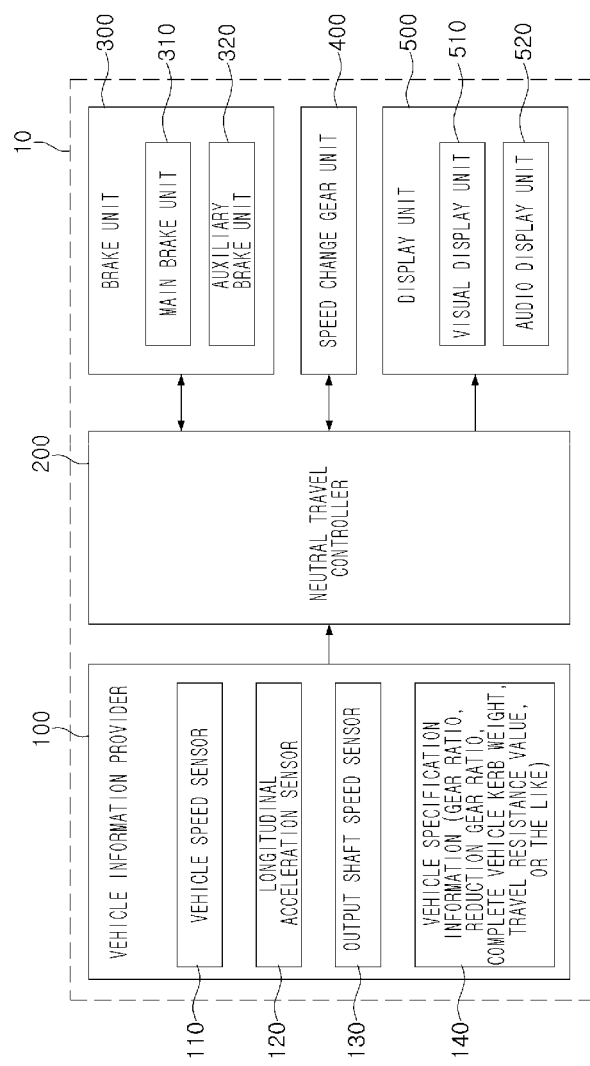
FIG. 1 is a block diagram illustrating a neutral travel control apparatus according to an example embodiment of the present disclosure.

Various modifications may be made to the example embodiments. In the instant case, the example embodiments are not construed as limited to the disclosure and should be understood to include all changes, equivalents, and replacements within the idea and the technical scope of the disclosure.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component. The term "and/or" may include combinations of a plurality of related described items or any of a plurality of related described items.

The terminology used herein is for the purpose of describing particular example embodiments only and is not to be limiting of the example embodiments. As used herein, the singular forms "a," "an," and "the" are intended to include the plural forms as well, unless the context clearly indicates otherwise. As used herein, the term "and/or" includes any one and any combination of any two or more of the associated listed items. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as having an ideal or excessively formal meaning, unless otherwise defined herein.

A speed limiter may be an apparatus for controlling a speed of a vehicle by adjusting a fuel injection quantity when the vehicle exceeds a speed limit. The speed limiter may be often installed in heavy commercial vehicles. However, when the vehicle travels in neutral on a slope, the vehicle may travel in excess of the speed limit despite the speed limiter because the vehicle does not travel by power of an engine. In addition, the vehicle on the slope accelerates with a gravitational acceleration proportional to a gradient of a road on which the vehicle is traveling. Therefore, even when the vehicle is travelling at a speed lower than the speed limit, a limit of braking performance of the vehicle may be exceeded unless the accelerating vehicle is braked in advance to decelerate. Accordingly, the present example embodiment is configured to control stable neutral travel of the vehicle by setting a limit value based on the braking performance of the vehicle. Hereinafter, a commercial vehicle is described for ease of description in the present specification, but example embodiments of the present disclosure are not limited to the commercial vehicle, and are applicable to all vehicles to which the speed limiter is applied.

Hereinafter, example embodiments of the present disclosure will be described in more detail with reference to the accompanying drawings.

FIG. 1 is a block diagram illustrating a neutral travel control apparatus 10 according to an example embodiment of the present disclosure.

Referring to FIG. 1, the neutral travel control apparatus 10 may include a brake unit 300 and a neutral travel controller 200, and may further include a vehicle information provider 100, a speed change gear unit 400, and a display unit 500.

The vehicle information provider 100 may provide, to the neutral travel controller 200, vehicle specification information 140 and information obtained from sensors installed in a vehicle. In the instant case, the vehicle specification information 140 may include information on a gear ratio according to a shift state, a final reduction gear ratio, a gross vehicle weight (GVW), a complete vehicle kerb weight (Kerb), or a travel resistance value. In addition, the vehicle information provider 100 may provide, to the neutral travel controller 200, a vehicle speed sensor 110 for detecting travel speed of the vehicle, a longitudinal acceleration sensor 130 for detecting longitudinal acceleration of the vehicle, an output shaft speed sensor 120 for detecting rotation speed of an output shaft of a speed change gear, and the like.

When a gear of the vehicle is changed to an N state, the neutral travel controller 200 may give attention to a driver using the display unit 500 and verify whether to change to the N state, thereby preventing neutral travel from being started due to a speed change gear operation error or the like. In addition, when the driver operates a gear despite a warning message regarding shifting to an N state and drives the vehicle in neutral, the neutral travel controller 200 may verify a travel state of the vehicle to control the brake unit 300, the speed change gear unit 400, and the display unit 500, thereby preventing an accident that may occur due to neutral travel.

The limit value, which is a value related to braking performance, may be a reference value for determining whether limit braking performance of the vehicle is exceeded. The limit value may be set according to an actual weight of the travelling vehicle, a gradient ratio of a road on which the vehicle is travelling, and the like. That is, the limit value may be set to be a value that does not exceed the limit braking performance of the vehicle according to the actual weight of the vehicle and the gradient ratio. The neutral travel controller 200 may decelerate the vehicle when the travel state of the vehicle exceeds a limit value. When the vehicle is deaccelerated to prevent a reduction in braking performance of a main brake unit caused by a degradation phenomenon or the like, the auxiliary brake unit may be operated first, and then the main brake unit may be operated. In addition, when the travel state of the vehicle exceeds the limit value, the neutral travel controller 200 may notify nearby drivers that the vehicle is traveling abnormally in neutral.

The neutral travel controller 200 may be implemented through a processor (not illustrated) configured to perform operations described below using a non-volatile memory (not illustrated) configured to store data related to an algorithm configured to control operations of various components of the vehicle or software instructions for reproducing the algorithm, and the data stored in the memory. In the instant case, the memory and the processor may be implemented as individual chips. Alternatively, the memory and processor may be implemented as a single chip integrated with each other. The processor may take the form of one or more processors. A detailed configuration of the neutral travel controller 200 will be described below with reference to FIG. 2.

The brake unit 300 may adjust braking force of the vehicle according to an instruction of the neutral travel controller 200. The brake unit 300 may include a main brake unit 310 and an auxiliary brake unit 320 for generating braking force with respect to a wheel by means of operation or auxiliary power of the driver. The main brake unit 310 may be an apparatus for braking by the driver pressing a pedal or directly applying a frictional force to the wheel through control. For example, in the case of a commercial vehicle to which a compressed air brake is applied, brake pressure may be adjusted and braked by controlling an air purge unit in addition to a brake pedal operated by the driver.

The auxiliary brake unit 320 may include an engine brake, a retarder brake, and the like. The engine brake may include an exhaust brake and a Jake brake. The exhaust brake may generate braking force by blocking an exhaust passage of an engine. The Jake brake may perform an exhaust stroke immediately after a compression stroke is performed without going through an explosion stroke in a four-stroke process of intake, compression, explosion, and exhaust of the engine. The retarder brake may perform braking using hydraulic friction generated by returning transmission fluid in a direction opposite to a direction of rotation of a transmission inside and outside the transmission. The retarder brake may decelerate the vehicle even during neutral travel by performing braking in the transmission, but the exhaust brake and Jake brake, which operate by controlling an output of the engine, may not operate as a brake because the vehicle travels in a state in which a speed change gear is separated during neutral travel. Accordingly, the vehicle using, as the auxiliary brake unit, the engine brakes such as the exhaust brake and the Jake brake may further need to shift to a drive (D) state.

When an excessive load is applied to the main moving part or when the main brake unit is used continuously, a friction coefficient may be temporarily lowered by high heat generated, which may cause a degradation phenomenon resulting in a reduction in braking performance. Therefore, when there is a risk of degradation in the main dynamic unit, the auxiliary brake unit may be operated first (S702 in FIGS.

Figure 5:
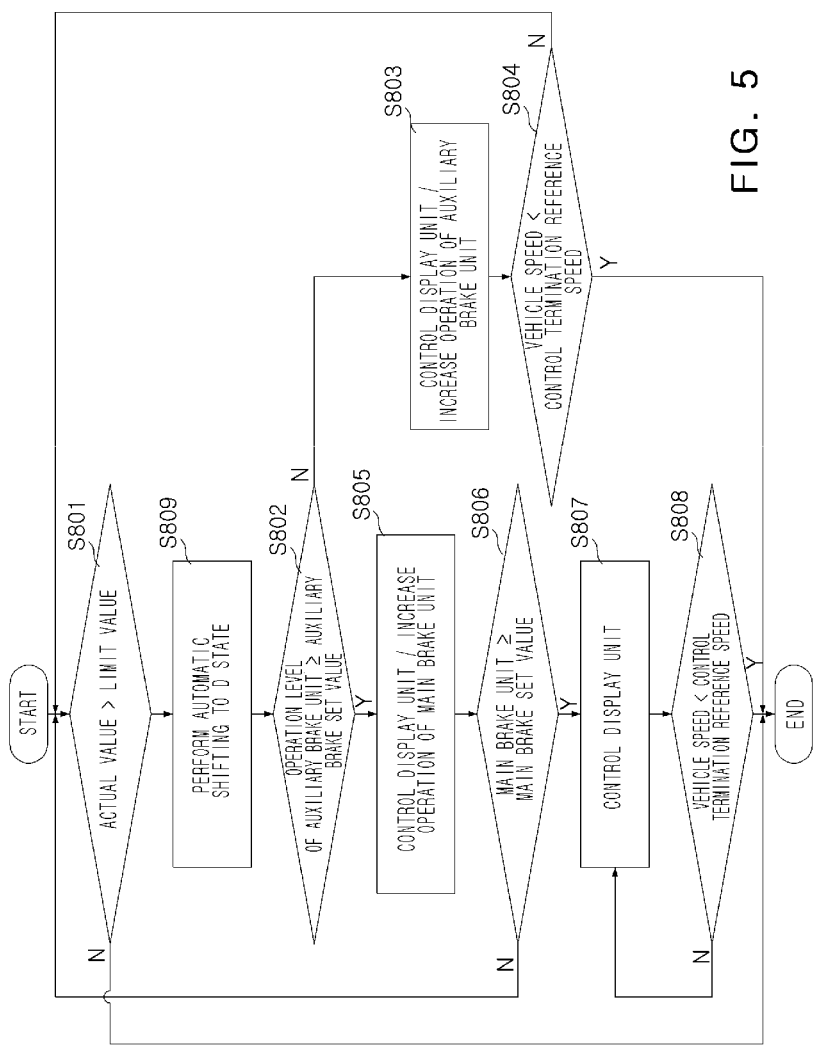
FIG. 5 is a flowchart illustrating a method of controlling a brake unit, a speed change gear unit, and a display unit in a neutral travel control method according to another example embodiment of the present disclosure.

4 and S802 in FIG. 5). When the engine brake is used as the auxiliary brake unit, the vehicle may be decelerated after shifting to the D state. However, when the gear is shifted at high speed, a sudden load change may occur in the transmission, which may damage the speed change gear or shorten an expected lifespan. Therefore, when there is a risk of damage to the transmission, the main brake unit may be operated first (S902 in FIG. 6).

The speed change gear unit 400 may generally include a D state, a neutral (N) state, a reverse (R) state, and a parking (P) state. The speed change gear unit 400 may transfer, to the neutral travel controller 200, information on a gear being currently driven. In addition, the speed change gear unit 400 may shift the gear by operation of a user or according to an instruction of the neutral travel controller 200. For example, referring to the example embodiment of FIG. 3, it is possible to perform shifting to the N state by verifying whether the driver selects shifting (S605 and S608). In addition, referring to the example embodiment of FIGS. 4 to 6, when a specific condition is satisfied, it is possible to automatically shift to the D state (S705, S809, and S905).

The display unit 500 may display a warning about neutral travel to a driver who changes the speed change gear to the N state. The display unit 500 may include a visual display unit 510 and an auditory display unit 520. The visual display unit 510 may include a cluster including a vehicle display, an emergency light, a taillight, a headlight, and the like. The auditory display unit 520 may include vehicle audio and a horn. When an operating of shifting to the N state shift operation is verified, the neutral travel controller 200 may confirm whether shifting to the N state is performed or display a warning message regarding shifting to the N state to the driver through the display unit 500. In addition, when abnormal neutral travel is performed, the display unit 500 may induce defensive driving by notifying nearby drivers that the vehicle is abnormally travelling in neutral. For example, when both the main brake unit and the auxiliary brake unit have values greater than or equal to a brake set value, the vehicle may sound a horn and repeatedly operate a high beam to notify nearby drivers that the vehicle is abnormally travelling in neutral.

Figure 2:
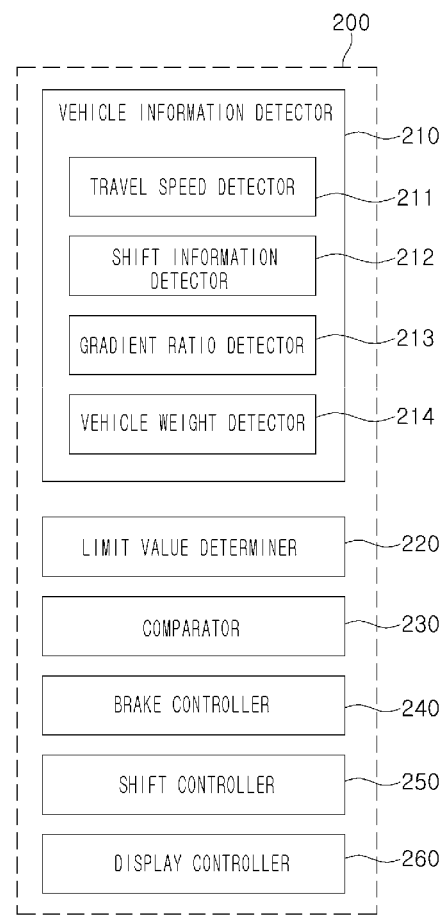
FIG. 2 is a block diagram illustrating a neutral travel controller according to an example embodiment of the present disclosure.

FIG. 2 is a block diagram illustrating a neutral travel controller 200 according to an example embodiment of the present disclosure.

The neutral travel controller 200 may include a vehicle information detector 210, a limit value determiner 220, a comparator 230, a brake controller 240, a shift controller 250, and a display controller 260.

The vehicle information detector 210 may detect information required for neutral travel control, using information received from the vehicle information provider 100. According to an example embodiment of the present disclosure, it is possible to prevent an accident and induce safe driving by controlling a vehicle travelling over a speed limit in neutral on a downhill road. The vehicle information detector 210 may use the information provided from the vehicle information provider 100 to determine whether the vehicle is travelling in the N state, detect a gradient ratio of a road on which the vehicle is travelling, and detect a weight of the vehicle.

The vehicle information detector 210 may include at least some of a travel speed detector 211, a shift information detector 212, a gradient ratio detector 213, and a vehicle weight detector 214.

The travel speed detector 211 may detect a travel speed of the vehicle. There may be various methods for detecting the travel speed of the vehicle. For example, the travel speed of the vehicle may be directly transferred through the vehicle speed sensor 110 of the vehicle information provider 100. In the instant case, the vehicle speed sensor 110 may be a sensor measuring a speed of the vehicle using a rotational speed of the wheel and a dynamic radius of a tire. A method of using the travel speed of the vehicle through calculation may include a method of using revolution per minute (RPM) of an engine and a method of using an RPM of an output shaft of a transmission. A vehicle speed obtained using the vehicle speed sensor 110 may be referred to as a first speed, a vehicle speed calculated using an RPM of an engine may be referred to as a second speed, and a vehicle speed calculated using an RPM of a transmission output shaft may be referred to as a third speed. In the instant case, the second speed and the third speed may be calculated through Equations 1 and 2 below, respectively.

$$\text{second speed} = \text{engine rpm} \times 0.06 \times 2\pi \times \text{tire dynamic radius} \div (\text{each state gear ratio} \times \text{final reduction gear ratio}) \quad \text{[Equation 1]}$$

$$\text{third speed} = \text{transmission output shaft RPM} \times \text{tire dynamic radius} \times \text{final reduction gear ratio} \quad \text{[Equation 2]}$$

In the instant case, a gear ratio of each state of Equation 1 and final reduction gear ratios of Equations 1 and 2 may be a unique value that each vehicle has as a ratio according to the number of teeth of engaged gears, and may be verified in the vehicle specification information 140 received from the vehicle information provider 100. In Equation 2, a value of 0.06 may be a value for converting a unit of RPM into a unit of km/h.

In addition, the first speed may be obtained through the vehicle speed sensor as a vehicle speed, and the third speed may be calculated through the RPM of the output shaft of the transmission of the vehicle, thereby verifying a speed at which the vehicle actually travels. The second speed may be calculated through the RPM of the engine, and thus a difference from an actual travel speed may occur when the engine and the transmission are not connected in the same manner as neutral travel. Accordingly, when a difference between the first speed or the third speed and the second speed exceeds a preset range, it may be determined as neutral travel.

The shift information detector 212 may detect whether the speed change gear is changed to the N state. Vehicle shift information may verify a gear state currently being driven by receiving a signal directly from a position of a transmission gear shift (TGS) lever or the transmission.

The gradient ratio detector 213 may verify a gradient ratio of a road on which the vehicle is traveling. The gradient ratio may be verified through a longitudinal acceleration sensor 130. For example, when an output value from the longitudinal acceleration sensor 130 is a (+) value, the road may be estimated as an uphill road, and when the output value is a (−) value, the road may be estimated as a downhill road. Accordingly, it is possible to estimate a slope of the uphill road or the downhill road according to a magnitude of the output value. In addition, the gradient ratio detector 213 may estimate a slope through a power load ratio and a travel resistance value of the vehicle. For example, when the vehicle is traveling the downhill road, the vehicle may be affected by gravity, and accordingly, the power load ratio of the vehicle may be reduced. Therefore, the gradient ratio of the road may be estimated through the reduced power load ratio. The travel resistance value of the vehicle, a numerical value of air resistance and road friction that the vehicle receives while travelling, may include rolling resistance, air resistance, slope resistance, curve resistance, and the like.

The travel resistance value, a value generally measured through a test, may be included in the vehicle specification information 140.

The vehicle weight detector 214 may detect an actual weight of the vehicle. The actual weight of the vehicle may be inferred through electronically controlled air suspension (ECAS). In the instant case, the ECAS can verify an axial load of an axle applied, so that the actual weight of the vehicle may be verified. In addition, the actual weight of the vehicle may be inferred through the longitudinal acceleration sensor 130 and the travel resistance value of the vehicle. The travel resistance value may actually change according to a weight of the vehicle, and thus the weight of the vehicle may be estimated by comparing a difference between a travel resistance value that is estimated using the vehicle longitudinal acceleration sensor 130 and a travel resistance value that is input.

The limit value determiner 220 may determine a limit value based on information received from the vehicle information detector 210 and the vehicle information provider 100. In the instant case, the limit value may be set according to braking limit performance of the vehicle. The limit value may be set so that force applied to the vehicle does not exceed the braking limit performance or energy of the vehicle does not exceed braking limit energy. For example, the braking limit performance may be represented in units of force as shown in Equation 3, and may be represented in units of energy as shown in Equation 4.

$$\text{braking limit performance } (F) > ma + mg\sin\theta \quad \text{[Equation 3]}$$

$$\text{braking limit performance } (W) > \frac{1}{2}mv^2 + mg\sin\theta t \quad \text{[Equation 4]}$$

In the instant case, m may be an actual weight of a vehicle, g is a fixed value of gravity acceleration, and θ may be a non-adjustable value of a road gradient. The limit value may need to be adjustable through control. Thus, in Equation 3, the limit value may be acceleration (a), and in Equation 4, the limit value m may be a kinetic energy ($\frac{1}{2}$ mv$^2$) or a speed (v). The limit value may be a value that may be set by a manufacturer, a seller, or the like within the braking limit performance. In addition, the limit value may be applied by preparing a table as illustrated in FIGS. 8 and 9 according to a predetermined reference, and selecting a value corresponding to a travel state of the vehicle from the table. In the case of using the table, a first constant value according to a weight of the vehicle may be set, and a second constant value according to a gradient ratio of the road may be set. For example, the first constant value may be set based on a gross vehicle weight (GVW) and a complete vehicle kerb weight (Kerb) of the vehicle. The first constant value may be set in multiple steps by comparing the actual weight of the vehicle with the GVW and the Kerb. The first constant value may have a larger value when the actual weight of the vehicle increases. The first constant value may be a first-first set value (for example, 2) when the actual weight of the vehicle has a value greater than or equal to the GVW, may be a first-second set value (for example, 1) when the actual weight of the vehicle has a value less than the GVW and greater than or equal to a ½GVW, and may be a first-third set value (for example, 0) when the actual weight of the vehicle has a value greater than or equal to the Kerb and less than the ½ GVW. In addition, the second constant value may be set based on a magnitude of a gradient ratio of the vehicle. The second constant value may be set in multiple steps according to a gradient ratio of a road on which the vehicle is traveling. The second constant value may have a larger value when the gradient ratio is small. The second constant value may be a second-first set value (for example, 4) when the gradient ratio is less than −6%, may be a second-second set value (for example, 2) when the gradient ratio is greater than −3%, and may be a second-third set value (for example, 1) when the gradient ratio is greater than or equal to −6% and less than −3. The first constant value, the second constant value, and a range for selecting the first and second constant values may be set by a manufacturer based on braking performance of the vehicle. There may be an effect of simply defining vehicle information by constantizing a weight and a gradient ratio according to a predetermined section. In addition, by using the first constant and the second constant, the table of the limit value may be simplified, and the limit value may be more easily obtained.

The comparator 230 may compare an actual value with a limit value, a low-speed allowable speed, a control termination reference speed, a first shift warning reference value, a second shift warning reference value, an auxiliary brake set value, or a main brake set value, and may transfer a result of the comparison to the brake controller 240, the shift controller 250, or the display controller 260. For example, an actual value corresponding to a limit value may be detected, and the limit value may be compared with the actual value. The limit value and the actual value have the same unit, the actual value may be a value obtained from a current state of the travelling vehicle, and the limit value may be a value corresponding to a limit of braking performance of the vehicle. When the limit value is determined as acceleration using FIG. 8, a limit acceleration value and an actual acceleration value of the vehicle may be compared to each other, and a result of the comparison may be transferred to the brake controller 240 and the display controller 260. In addition, when the limit value is determined as braking energy using FIG. 9, a limit energy value and an actual kinetic energy value of the vehicle may be compared to each other, and a result of the comparison may be transferred to the brake controller 240 and the display controller 260.

In addition, when a low-speed travel speed value allowing neutral travel is set, the comparator 230 may compare the low-speed travel speed value with an actual travel speed. In the instant case, the low-speed allowable speed may be a speed that is a reference for low-speed travel allowing neutral travel for convenience of a driver. The control termination reference speed may be a speed that is a reference for terminating neutral travel control. When a travel speed of the vehicle is less than the control termination reference speed, the neutral travel control may be terminated. The first shift warning reference value or the second shift warning reference value may be a value for determining a content of a message transferred to the driver when the driver shifts a gear to an N state. The content of the message transferred to the driver may be changed using the first shift warning reference value or the second shift warning reference value, thereby notifying the driver of a risk of shifting to the N state according to a travel state, and alerting the driver to the risk of shifting to the N state. In addition, the auxiliary brake set value may be a set value for starting an operation of a main brake unit when auxiliary braking is first controlled (S702 in FIG. 4), and may be a set value for operating a display unit to notify a nearby driver that the vehicle is travelling dangerously in neutral when the main brake unit is first controlled (S906 in FIG. 6). The main brake set value may be a set value for starting an operation of an auxiliary brake unit when the main brake unit is first controlled (S706 in FIG. 4), and may be a set value for operating the display unit to warn a nearby driver by verifying a brake state of the main brake unit when the auxiliary brake unit is controlled first (S902 in FIG. 6).

Figure 4:
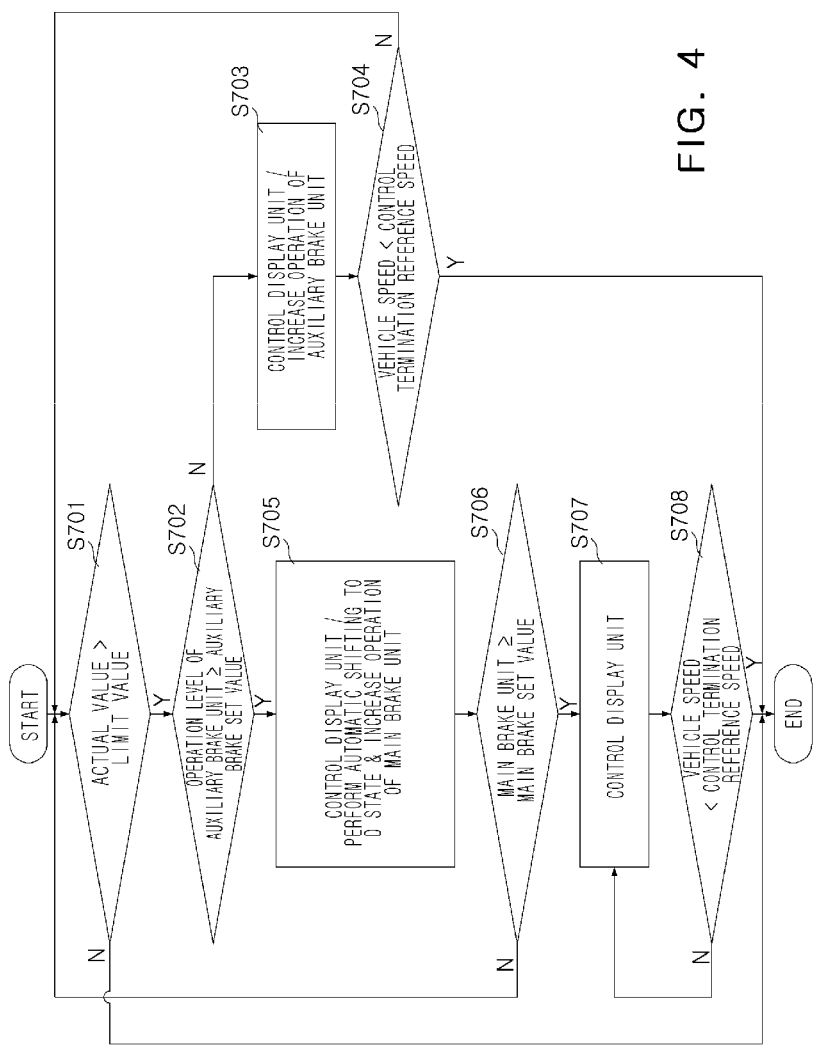
FIG. 4 is a flowchart illustrating a method of controlling a brake unit, a speed change gear unit, and a display unit in a neutral travel control method according to an example embodiment of the present disclosure.

The brake controller 240 may control the brake unit 300 according to a result received from the comparator 230 to brake the vehicle. The brake controller 240 may control the main brake unit 310 or the auxiliary brake unit 320 to decelerate the vehicle. The brake controller 240 may verify a current brake state of the main brake unit 310 or the auxiliary brake unit 320. That is, the brake controller 240 may verify a degree of a load of the main brake unit 310 or the auxiliary brake unit 320 is currently being performed, and whether the load is equal to or exceeds a main brake set value or an auxiliary brake set value. Referring to FIG. 4, in order to protect a main brake unit, an auxiliary brake unit may be first operated to reduce a load applied when the main brake unit is operated. In this case, the main brake unit may be operated when the auxiliary brake unit has a value equal to or exceeds the auxiliary brake set value (S702 and S705). Conversely, referring to FIG. 6, a speed of the vehicle may be reduced by first operating the main brake unit to protect a transmission. In this case, the auxiliary brake unit may be operated when the main brake unit has a value greater than or equal to the main brake set value (S902 and S905).

The shift controller 250 may change a gear of the vehicle by controlling the speed change gear unit 400 according to a result received from the comparator 230. For example, the shift controller 250 may shift the gear of the vehicle from a D state to an N state according to the driver's selection (S608 in FIG. 4). In addition, when a travel state of the vehicle satisfies a specific condition, the gear of the vehicle may be shifted from the N state to the D state (S705 in FIGS. 5 and S905 in FIG. 7). In addition, in order to operate an engine brake, the gear of the vehicle may be shifted from the N state to the D state (S809 in FIG. 6).

The display controller 260 may control the visual display unit 510 or the auditory display unit 520 based on the result received from the comparator 230. For example, when the driver intends to shift to the N state, a message for verifying whether shifting to the N state is correct may be displayed in order to prevent an erroneous operation by mistake. In this case, when shifting to the N state is to be performed, a travel state of the vehicle may be verified. When the travel state does not satisfy a shift verification reference condition, the display controller 260 may recommend the driver to drive in the D state or may notify the driver of a risk of shifting to the N state (S603 and S606 in FIG. 3). In addition, the display controller 260 may operate an emergency light or horn of the vehicle to induce a nearby driver of the vehicle that is travelling abnormally in neutral to drive defensively. In this case, an operation of the display unit may be changed according to a neutral travel state of the vehicle. For example, when an actual value of the vehicle is greater than a limit value, and accordingly the auxiliary brake unit starts to operate, the driver may be notified that the auxiliary brake unit has started, and the emergency light of the vehicle may be operated to notify an external driver that the vehicle is travelling abnormally in neutral. (S703 in FIGS. 4 and S803 in FIG. 5). In addition, when the operation of the auxiliary brake unit is equal to or exceeds the auxiliary brake set value, the main brake unit may be operated while generating a beep sound using an audio device in the vehicle, notifying the driver of the risk through a warning message, and operating a taillight and an emergency light of the vehicle, thereby allowing the external driver to more easily recognize that the vehicle is travelling abnormally (S705 in FIGS. 4 and S805 in FIG. 5). In addition, when both the main and auxiliary brake units exceed the set values, the horn and high beam of the vehicle may be repeatedly operated, thereby notifying the external driver that the vehicle is travelling abnormally in neutral to induce safe driving (S707 in FIGS. 4 and S807 in FIG. 5).

Figure 3:
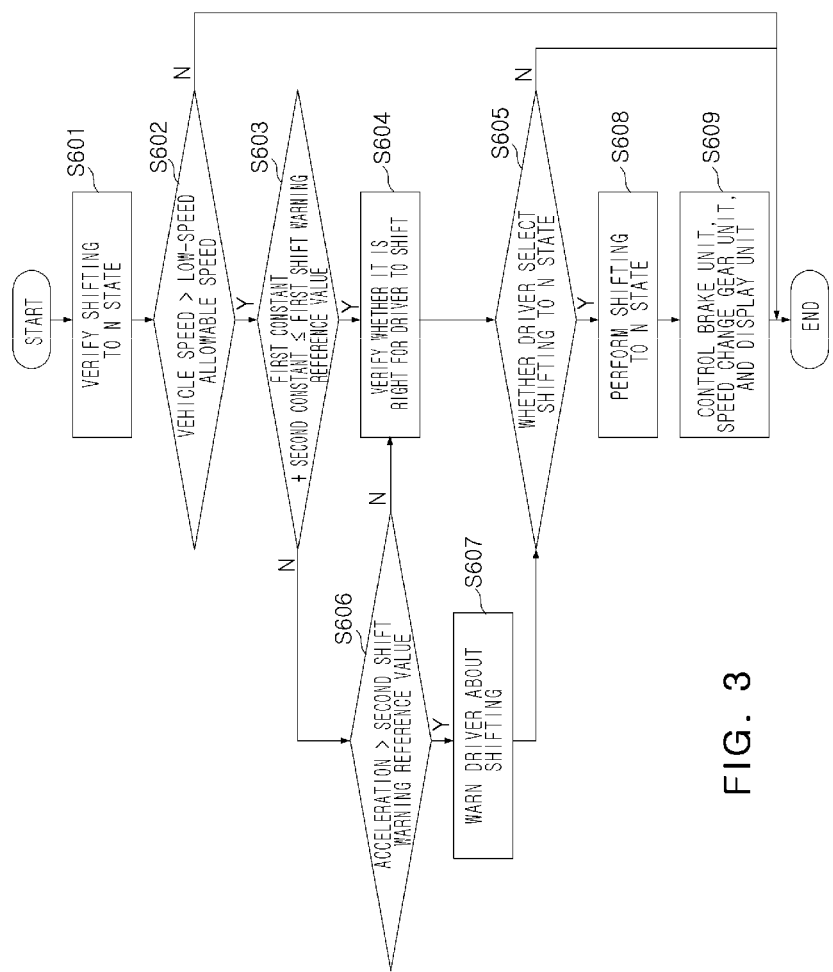
FIG. 3 is a flowchart illustrating a neutral travel control method according to an example embodiment of the present disclosure.

A neutral travel control method according to an example embodiment of the present disclosure will be described below. FIG. 3 is a flowchart illustrating a neutral travel control method according to an example embodiment of the present disclosure.

First, when a driver shifts the gear to an N state (S601), it is possible to determine whether to perform neutral travel control by comparing a speed of a vehicle with a low-speed allowable speed (S602). The low-speed allowable speed may be a speed that is a reference for determining whether the vehicle is travelling at low speed allowing neutral travel. When the vehicle is traveling at low speed, a risk of an accident that may occur due to speeding may be low, so that neutral travel may be allowed. In addition, a speed change gear of the vehicle may be positioned in the N state between a D state and an R state. Thus, when the vehicle is parked, it may be necessary to operate the gear in an order of the D state, the N state, and the R state, or in an order of the R state, the N state, and the D state. When a change to the N state is limited even at low speed, the driver may verify whether shifting to the N state is performed every time the gear is shifted to the D state or the R state for parking, which may cause excessive burden and inconvenience for the driver. Therefore, when the speed of the vehicle is lower than a low-speed reference speed, shifting to the N state may be allowed.

When the speed of the vehicle is greater than the low-speed allowable speed, a weight and a gradient ratio of the vehicle may be detected and compared with a first shift warning reference value for determining a message displayed to the driver (S603). In the instant case, a first shift warning reference value may be a value that is a reference for determining a message displayed to the driver. For example, as a road on which the vehicle is travelling has a larger gradient ratio and the vehicle has a larger weight, force that the vehicle receives on a downhill road may be increased. Accordingly, when the weight and gradient ratio of the vehicle are equal to or less than the first shift warning reference value, only a verification message as to whether shifting to the N state is performed may be transferred to the driver. Conversely, when the weight and gradient ratio of the vehicle are greater than the first shift warning reference value, a message for recommending travelling in the D state or a message for warning shifting to the N state together with a message for verifying whether or not shifting to the N state may be transferred for safety, thereby alerting the driver to a risk of changing from a current travel state to neutral travel. In the instant case, the first shift warning reference value may be compared with a sum of a first constant value set according to the weight of the vehicle and a second constant value set according to the gradient ratio of the road. For example, the sum of the first constant value and the second constant value of the vehicle may be compared with the first shift warning reference value (for example, 4) to determine whether to simply verify whether shifting to the N state is performed or to warn about shifting to the N state. First, when the sum of the first constant value and the second constant value of the vehicle is less than or equal to the first shift warning reference value (for example, 4), it is possible to verify whether it is right for the driver to shift to the N state (S604). For example, a pop-up message including a guidance saying "The vehicle is travelling. Do you want to change to the N state?" may be generated on a display screen of a cluster. The driver may give a response as to whether to change to the N state with respect to the guidance message (S605). When the driver selects to shift to the N state, the driver may shift to the N state (S608). When the driver shifts to the N state despite the guidance message, the brake unit 300, the speed change gear unit 400, and the display unit 500 may be additionally controlled based on a travel state of the vehicle or the like (S609). In the instant case, when there is no response for more than a predetermined period of time or when shifting to the N state is canceled, the D state may be maintained, and shifting to the N state may be performed only when the response is made within the predetermined period of time. When the sum of the first constant value and the second constant value of the vehicle is greater than the first shift warning reference value (for example, 4), a current acceleration of the vehicle may be compared with a second shift warning reference value (for example, 0.15 g) (S606). The second shift warning reference value may be a value for determining force acting on the vehicle together with the road gradient ratio and the vehicle weight, and may be set in consideration of braking performance of the vehicle. When a limit value is a reference for determining a risk of the vehicle while the vehicle is travelling in neutral, the first shift warning reference value or the second shift warning reference value may be a reference for determining a risk when the vehicle starts travelling in neutral. When the vehicle weight and the road gradient ratio exceed the first shift warning reference value and the vehicle acceleration exceeds the second shift warning reference value, the speed may be rapidly accelerated at the same time as start of neutral travel, so that it may be dangerous from a moment the vehicle starts travelling in neutral. Accordingly, in a stage when the driver starts travelling in neutral, a content of a message transferred to the driver through the first shift warning reference value and the second shift warning reference value may be differentiated, thereby inducing shifting to the N state not to be performed in a state where it is dangerous to start neutral travel. When the vehicle acceleration does not exceed the second shift warning reference value, the process may return to operation S604. When the vehicle acceleration exceeds the second shift warning reference value, a warning about shifting to the N state may be issued to the driver (S607). For example, on the display screen of the cluster, it is possible to generate a pop-up message including a warning saying "For safety, driving in the D state is recommended. Do you want to change to the N state?" or "Shifting to the N state in a current travel state can be dangerous. Do you want to change to the N state?" The driver may give a response as to whether to change to the N state with respect to the warning message (S605). When the driver selects to shift to the N state, the driver may shift to the N state (S608). In the instant case, when there is no response for more than a predetermined period of time or when shifting to the N state is canceled, the D state may be maintained, and shifting to the N state may be performed only when the response is made within the predetermined period of time. Through operations S604, S605, and S607, shifting to the N state may be performed through the driver's selection, thereby reminding safety-related matters with respect to neutral travel, and preventing shifting to the N state caused by the driver's mistake.

When the driver shifts to the N state despite the guidance message or warning message, the brake unit 300, the speed change gear unit 400, and the display unit 500 may be additionally controlled based on the travel state of the vehicle (S609). The details of operation S609 will be described below with reference to FIGS. 4 to 6. However, operation S609 to be described below in FIGS. 4 to 6 do not necessarily need to go through operations S602 to S607 of asking the driver to verify whether to shift. That is, operation S609 may be performed when the vehicle starts travelling after shifting to the N state regardless of whether operations S602 to S607 are performed.

FIG. 4 is a flowchart illustrating a method of controlling the brake unit 300, the speed change gear unit 400, and the display unit 500 in a neutral travel control method when a vehicle using a retarder brake as an auxiliary brake unit is traveling in neutral.

The retarder brake, which use a method of braking using hydraulic friction generated by returning transmission fluid in a direction opposite to a direction of rotation of a transmission, may generate braking force even when travelling in neutral.

Figure 7:
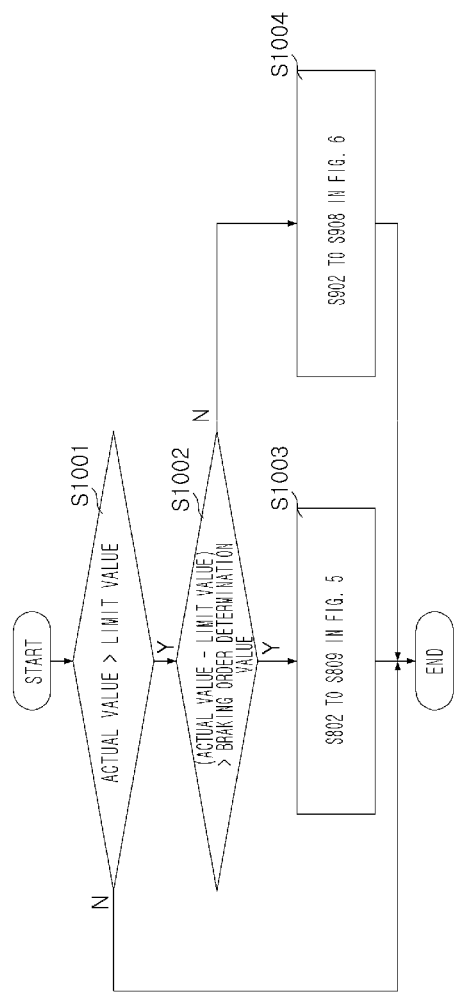
FIG. 7 is a flowchart illustrating a method of controlling a brake unit, a speed change gear unit, and a display unit in a neutral travel control method according to another example embodiment of the present disclosure.

When a driver shifts a gear to an N state, neutral travel may be controlled by comparing a travel state of a vehicle with a limit value (S701). In the instant case, the limit value, a value set according to an actual weight of the vehicle, a gradient ratio of a road on which the vehicle is travelling, and the like, may be a value set based on limit braking performance of the vehicle. For example, the limit value may be set as a limit acceleration value as illustrated in FIG. 7. When the vehicle is traveling on a downhill road, the vehicle receives a magnitude of force proportional to a gradient of a slope with respect to gravity in a travel direction due to gravity. Accordingly, a limit acceleration value may be set so that limit braking force of the vehicle has a value less than a value obtained by adding force generated due to gravity to a magnitude of force calculated by multiplying an acceleration of the vehicle by a weight of the vehicle. In addition, the limit value may be calculated through calculation. After a section having a predetermined range is set with respect to the weight and gradient ratio as illustrated in FIG. 7, a table in which a limit acceleration value is set with respect to the section may be used. Accordingly, the limit value may be compared with an actual value detected from the vehicle. When the actual value is less than the limit value, a brake of the vehicle may be used to prevent an accident, so that neutral travel may be allowed. Conversely, when the actual value exceeds the limit value, the vehicle may travel to be greater than or equal to (or to exceed) braking performance of the vehicle, so that a risk of an accident may be increased. Thus, neutral travel control may be performed.

Referring back to FIG. 4, when the actual value exceeds the limit value, an operation level of an auxiliary brake unit may be verified (S702). When the operation level of the auxiliary brake unit is less than an auxiliary brake set value, the operation level of the auxiliary brake unit may be increased. In the instant case, the auxiliary brake set value, a set value for starting an operation of a main brake unit, may be a maximum operation level of the auxiliary brake unit. In addition, the driver may be notified that auxiliary braking is performed through a pop-up message saying "Auxiliary braking is performed for safety" displayed on a display screen of a cluster or a voice notification. In addition, a taillight may be operated to notify a nearby driver of the vehicle that the vehicle is travelling in neutral, thereby inducing defensive driving (S703). After the operation level of the auxiliary brake unit is increased, it is possible to verify whether a travel speed of the vehicle is less than a control termination reference speed (S704). In the instant case, the control termination reference speed may be a reference speed for terminating neutral travel control when neutral travel of the vehicle is considered as controllable neutral travel within a braking performance range, and allowing the neutral travel. When the travel speed of the vehicle is less than the control termination reference speed, the neutral travel control may be terminated. When the travel speed of the vehicle is greater than or equal to the control termination reference speed, the process may return to operation S701, thereby continuously alerting the driver and a driver of a nearby vehicle, gradually increasing the operation level of the auxiliary brake unit, and increasing braking force of the vehicle.

When the operation level of the auxiliary brake unit is greater than or equal to the auxiliary brake set value, additional braking other than the main brake unit may not be expected, so that a risk of an accident may be increased. Therefore, when the operation level of the auxiliary brake unit is greater than or equal to the auxiliary brake set value, it is possible to warn the driver more strongly by guiding the driver through a pop-up message saying "Gear shifting and braking is performed for safety", and generating a beep sound in the vehicle, and to turn on an emergency light together with the taillight, thereby allowing drivers of nearby vehicles to easily recognize that the vehicle is travelling unsafely in neutral (S705). In addition, the abnormal neutral travel may be stopped by automatically shifting to a D state (S705). In addition, a magnitude of braking force of the main brake unit may be increased gradually or in a stepwise manner (S705). As described in connection with operations S702 to S705, the gear may be shifted after the vehicle is decelerated by operating the auxiliary brake unit first, thereby preventing damage to the speed change gear that may occur due to a sudden increase in load and increase in rotational speed when the gear is shifted at high speed. In addition, the main brake unit may be operated after the vehicle is decelerated using the auxiliary brake unit first, thereby preventing a reduction in braking performance occurring due to a degradation phenomenon caused by overheating of the main brake unit.

The main brake set value, a value that is a reference for determining whether an increase in additional braking force of a main brake device is possible, may be a maximum operation level of the main brake unit. A brake state of the main brake unit may be compared with the main brake set value. When the brake state is less than the main brake set value, the process may return to operation S701 to control the vehicle (S706). In the instant case, when the main brake unit is equal to or greater than the main brake set value, additional braking may not be applied to the vehicle, which may be very dangerous. Accordingly, when the performance of the main brake unit is equal to or greater than the main brake set value, it is possible to repeatedly turn on and off a high beam, and generate a horn to actively notify nearby drivers, thereby inducing defensive driving. The control of the high beam and the horn may be continued until the vehicle speed becomes less than the control termination reference speed, and travel control may be terminated when the vehicle speed is reduced to be less than the control termination reference speed (S707).

Figure 6:
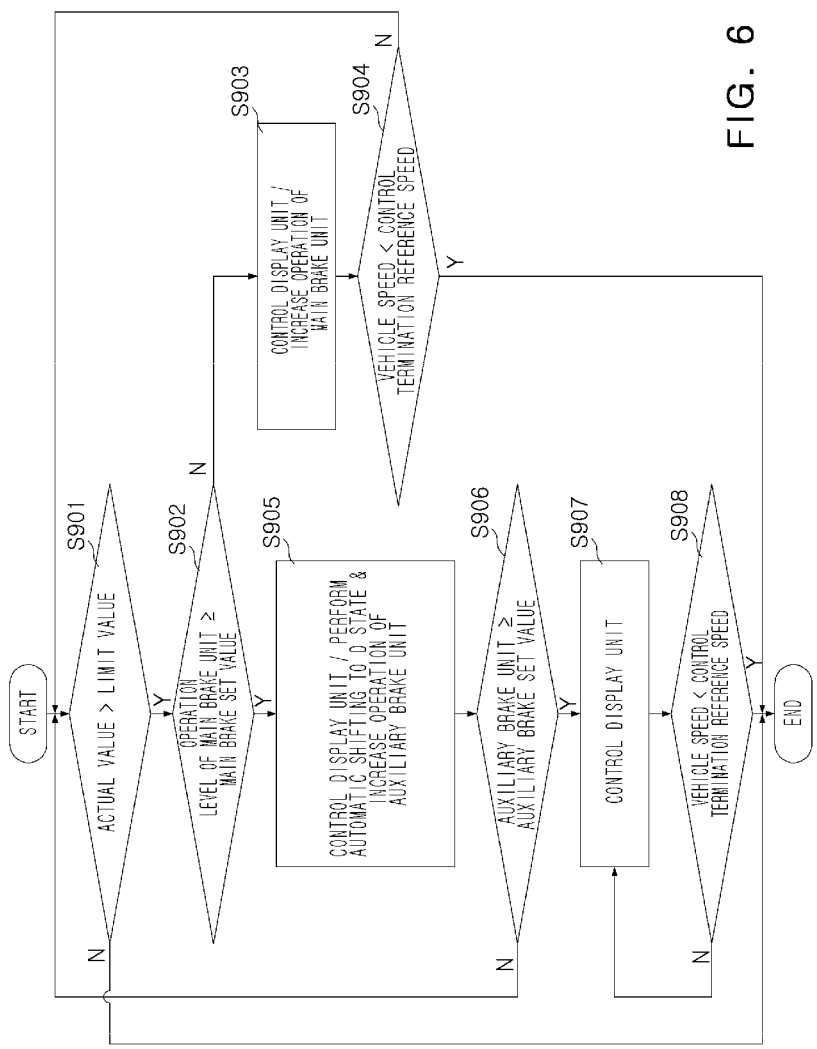
FIG. 6 is a flowchart illustrating a method of controlling a brake unit, a speed change gear unit, and a display unit in a neutral travel control method according to another example embodiment of the present disclosure.

FIGS. 5 and 6 are flowcharts illustrating a method of controlling the brake unit 300, the speed change gear unit 400, and the display unit 500 in a neutral travel control method of a vehicle to which an engine brake including a Jake brake or an exhaust brake is applied as an auxiliary brake unit. Hereinafter, a difference between the example embodiments of FIGS. 5 and 6 will be described based on the example embodiment of FIG. 4.

Unlike the retarder brake, the engine brake such as the Jake brake or the exhaust brake, an apparatus of decelerating by controlling an output of an engine, may not reduce a travel speed of the vehicle because the output of the engine and a speed change gear are separated from each other while the vehicle is travelling in neutral. Therefore, it may be necessary to perform an operation of shifting a gear from an N state to a D state before operating an auxiliary brake unit.

Referring to FIGS. 4 and 5, operations S701 to S708 of FIG. 4 may correspond to operations S801 to S808. However, between operation S801 corresponding to operation S701 and operation S802 corresponding to operation S702, that is, after a neutral travel state satisfies a predetermined condition (S801), an operation of performing automatic shifting from the N state to the D state (S809) may be further included before an operation of controlling an auxiliary brake unit (S802). In this case, even in a vehicle to which the engine brake is applied as the auxiliary brake unit, the auxiliary brake unit may be operated before a main brake unit by automatically shifting from the N state to the D state to decelerate the vehicle, thereby preventing braking performance from being lowered due to a degradation phenomenon of the main brake unit.

After operation S809, the control of FIG. 4 and the control of FIG. 5 may correspond to each other. For example, an operation level of the auxiliary brake unit may be verified (S702 and S802). When the operation level of the auxiliary brake unit is less than an auxiliary brake set value, the operation level of the auxiliary brake unit may be increased, and a driver may be notified that auxiliary braking is performed through a pop-up message saying "Auxiliary braking is performed for safety" displayed on a display screen of a cluster or a voice. In addition, a taillight may be operated to notify a nearby driver of the vehicle that the vehicle is travelling in neutral, thereby inducing defensive driving (S703 and S803). In this case, when the travel speed of the vehicle is less than a control termination reference speed, neutral travel control may be terminated. When the travel speed of the vehicle is greater than or equal to the control termination reference speed, the process may return to operation S801 to continuously perform control (S704 and S804).

When the operation level of the auxiliary brake unit is greater than or equal to the auxiliary brake set value, it is possible to warn the driver more strongly by guiding the driver through a pop-up message saying "Gear shifting and braking is performed for safety" displayed on a display of a cluster of the vehicle, and generating a beep sound in the vehicle (S705 and S805). An emergency light may be turned on together with a taillight to notify drivers of nearby vehicles that the vehicle is travelling abnormally in neutral, and automatic shifting from the N state to the D state may be performed to stop the abnormal neutral travel (S705 and S805). In addition, a magnitude of braking force of the main brake unit may be increased in a stepwise manner (S705 and S805).

In addition, a brake state of the main brake unit may be compared with a main brake set value. When the brake state of the main brake unit is less than the main brake set value, the process may return to operation S801 to control the vehicle (S706 and S806). In addition, when the brake state of the main brake unit is greater than or equal to the main brake set value, a high beam may be repeatedly turned on and off, and a horn sound may be generated to actively notify nearby drivers to induce defensive driving, and the control of the high beam and the horn may be continued until the vehicle speed becomes less than the control termination reference speed, and travel control may be terminated when the vehicle speed is reduced to be less than the control termination reference speed (S707 and S807).

Referring back to FIGS. 4 and 6, there is a difference between the example embodiments of FIGS. 4 and 6 in that the auxiliary brake unit is first used and then the main brake unit is used in the example embodiments of FIG. 4, and the main brake unit is used first and then the auxiliary brake unit is used in the example embodiments of FIG. 6. The vehicle may be first decelerated using the main brake unit of the vehicle, and then gear shifting may be performed to use the auxiliary brake unit, thereby preventing loss of durability of a speed change gear caused by a sudden increase in load and increase in rotational speed when the gear is shifted at high speed.

Similarly, there is a difference between FIGS. 5 and 6 in an order of applying the main brake unit and the auxiliary brake unit. In the example embodiment of FIG. 5, the auxiliary brake unit may be applied first to prevent degradation of the main brake unit, thereby preventing a reduction in braking performance. In the example embodiment of FIG. 6, the main brake unit may be operated first to reduce the vehicle speed, and then perform gear shifting, thereby preventing damage to a speed change gear caused by a sudden increase in load and increase in rotational speed when the gear is shifted at high speed. In other words, in FIGS. 4 and 5, when an actual value exceeds a limit value, the auxiliary brake unit may be first controlled, and then the main brake may be operated when the operation level of the auxiliary brake unit satisfies a predetermined condition (S702 to S705, S802 to S805, and S809). Conversely, referring to FIG. 6, when the actual value exceeds the limit value, the main brake unit may be first controlled (S902). When an operation level of the main brake unit is less than the main brake set value, the operation level of the main brake unit may be increased, and the driver may be notified that main braking is performed through a pop-up message saying "Main braking is performed for safety" or a voice notification. In addition, a taillight may be operated to notify a nearby driver of the vehicle that the vehicle is travelling in neutral, thereby inducing defensive driving (S903). In the instant case, when a travel speed of the vehicle is less than a control termination reference speed, neutral travel control may be terminated. When the travel speed of the vehicle is greater than or equal to the control termination reference speed, the process may return to operation S901 to continuously perform control (S904). In addition, when the operation level of the main brake unit is greater than or equal to the main brake set value, it is possible to warn the driver more strongly by guiding the driver through a pop-up message saying "Gear shifting and braking is performed for safety" displayed on a display of a cluster of the vehicle, and generating a beep sound in the vehicle (S905). An emergency light may be turned on together with a taillight to notify drivers of nearby vehicles that the vehicle is travelling abnormally in neutral, automatic shifting from the N state to the D state may be performed, and a magnitude of braking force of the main brake unit may be continuously increased (S905).

A brake state of the auxiliary brake unit may be compared with an auxiliary brake set value. When the brake state of the auxiliary brake unit is less than the auxiliary brake set value, the process may return to operation S901 to control the vehicle (S906). In addition, when the brake state of the auxiliary brake unit is greater than or equal to the auxiliary brake set value, a high beam may be repeatedly turned on and off, and a horn sound may be generated to actively notify nearby drivers to induce defensive driving (S907). In addition, the control of the high beam and the horn may be continued until the vehicle speed becomes less than the control termination reference speed, and travel control may be terminated when the vehicle speed is reduced to be less than the control termination reference speed (S907).

Referring to FIG. 7, the example embodiments of FIGS. and 6 may be integrated into one. For example, after operation S1001 corresponding to operation S801 or S901 of comparing a limit value and an actual value to each other in terms of a magnitude, operation S1002 of comparing a difference between the actual value and the limit value with a braking order determination value may be further included. In the instant case, the braking order determination value may be a value for determining whether braking is to be performed using an auxiliary brake unit first as illustrated in FIG. 5 or braking is to be performed using a main brake unit first as illustrated in FIG. 6. The braking order determination value may be a value determined according to braking performance of a vehicle and performance of a transmission. In other words, the braking order determination value may be a value determined in consideration of a condition in which braking force is reduced due to degradation of the main brake unit and a condition in which damage to the transmission may occur when shifting from an N state to a D state. In the instant case, when the difference between the actual value and the limit value exceeds the braking order determination value, the degradation of the main brake unit may occur, so that the process may return to operation S809 of FIG. 5 to operate the auxiliary brake unit first, and may return to operation S902 of FIG. 6 if within a predetermined range to operate the main brake unit first, thereby protecting the transmission.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts.

Examples of non-transitory computer-readable media include hardware devices that are specially configured to store and perform program instructions, such as read-only memory (ROM), random access memory (RAM), flash memory, and the like. Examples of program instructions include both machine code, such as produced by a compiler, and higher-level code that may be executed by the computer using an interpreter. The above-described devices may be configured to act as one or more software modules in order to perform the operations of the above-described example embodiments, or vice versa.

While example embodiments have been shown and described above, it will be apparent to those skilled in the art that modifications and variations could be made without departing from the scope of the present disclosure as defined by the appended claims.

What is claimed is:

1. A neutral travel control apparatus comprising:
a brake unit configured to brake a vehicle; and
a neutral travel controller configured to control the brake unit so that the vehicle travels within a braking performance range by determining, based on vehicle information, a limit value of braking performance of the travelling vehicle, and comparing the limit value with an actual value of the travelling vehicle corresponding to the limit value, wherein the limit value is a reference value for determining whether a travel state including an actual weight of the vehicle and a gradient ratio of a road exceeds the braking performance of the vehicle.

2. The neutral travel control apparatus of claim 1, wherein the limit value is determined as a limit acceleration value of the vehicle or a limit energy value of the vehicle based on one or more values of the actual weight, a travel speed, and a travel acceleration of the vehicle, and the gradient ratio of the road on which the vehicle is travelling.

3. The neutral travel control apparatus of claim 1, wherein the limit value is determined based on a table including a first constant set and a second constant set and the travel speed of the vehicle, wherein the first constant set represents a range of the actual weight of the vehicle the second constant set represents a range of the gradient ratio of the road on which the vehicle is travelling.

4. The neutral travel control apparatus of claim 1, further comprising:
a display unit configured to display an operating state of the vehicle using at least one of a display and a sound,
wherein when a driver changes a speed change gear from a drive (D) state to a neutral (N) state, the neutral travel controller is configured to transfer, to a driver, a guidance message for verifying whether to change to the N state through the display unit, and to maintain the D state until receiving a response to verify the change to the N state.

5. The neutral travel control apparatus of claim 1, wherein the brake unit includes a main brake unit and an auxiliary brake unit, and
when an actual value of the vehicle exceeds the limit value, the neutral travel controller is configured to decelerate the vehicle using at least one of the main brake unit and the auxiliary brake unit until the travel speed is reduced to be less than or equal to a predetermined speed.

6. The neutral travel control apparatus of claim 5, wherein the neutral travel controller is configured to decelerate the vehicle using the auxiliary brake unit before using the main brake unit.

7. The neutral travel control apparatus of claim 6, further comprising:
a speed change gear unit configured to change a gear of the vehicle,
wherein when a brake state of the auxiliary brake unit has a value greater than or equal to an auxiliary brake set value, the neutral travel controller is configured to control the speed change gear unit to automatically shift from an N state to a D state.

8. The neutral travel control apparatus of claim 6, wherein when a brake state of the auxiliary brake unit has a value greater than or equal to an auxiliary brake set value, the neutral travel controller is configured to control the main brake unit to decelerate the vehicle until the travel speed is reduced to be less than the predetermined speed.

9. The neutral travel control apparatus of claim 5, wherein the auxiliary brake unit includes a retarder brake, and
the neutral travel controller is configured to perform braking while increasing braking force of the retarder brake, and to decelerate the vehicle while increasing braking force of the main brake unit when the braking force of the retarder brake has a value greater than or equal to an auxiliary brake set value.

10. The neutral travel control apparatus of claim 5, wherein
the auxiliary brake unit includes an engine brake, and
the neutral travel controller is configured to change a speed change gear of the vehicle to a D state, and then perform braking while increasing braking force of the engine brake, and to decelerate the vehicle while increasing braking force of the main brake unit when the braking force of the engine brake has a value greater than or equal to an auxiliary brake set value.

11. The neutral travel control apparatus of claim 1, wherein when the actual value of the vehicle exceeds the limit value, the neutral travel controller is configured to warn at least one of a driver of the vehicle and an exterior of the vehicle that the vehicle is travelling in neutral.

12. The neutral travel control apparatus of claim 1, wherein the neutral travel controller is configured to:
i) receive a signal from a transmission gear shift lever of the vehicle, or
ii) determine whether the vehicle is travelling in neutral by comparing a first speed detected using a vehicle speed sensor or a third speed detected using revolutions per minute (RPM) of a speed change gear output shaft with a second speed calculated using engine RPM.

13. The neutral travel control apparatus of claim 1, wherein the neutral travel controller is configured to compare a travel speed with a low-speed allowable speed, wherein the low-speed allowable speed is a reference speed for determining whether the vehicle is travelling at low speed allowing neutral travel.

14. A neutral travel control method comprising:
determining, based on vehicle information, a limit value for braking performance of a vehicle; and
neutral travel controlling of comparing the limit value of the vehicle with an actual value of the travelling vehicle corresponding to the limit value, and controlling a speed of the vehicle using a brake unit of the vehicle,
wherein the limit value is a reference value for determining whether a travel state including an actual weight of the vehicle and a gradient ratio of a road exceeds the braking performance of the vehicle.

15. The neutral travel control method of claim 14, wherein the limit value is determined as a limit acceleration value of the vehicle or a limit energy value of the vehicle based on one or more values of the actual weight, a travel speed, and a travel acceleration of the vehicle, and the gradient ratio of the road on which the vehicle is travelling.

16. The neutral travel control method of claim 14, wherein the limit value is determined based on a table including a first constant set and a second constant set and the travel speed of the vehicle, wherein the first constant set represents a range of the actual weight of the vehicle the second constant set represents a range of the gradient ratio of the road on which the vehicle is travelling.

17. The neutral travel control method of claim 14, wherein the neutral travel controlling further includes:
transferring, to a driver, a guidance message for verifying whether to change to an N state using a display or a sound when a driver changes a speed change gear from a D state to the N state, and
maintaining the D state until receiving a response to verify the change to the N state.

18. The neutral travel control method of claim 14, wherein the neutral travel controlling further includes decelerating the vehicle using the brake unit including a main brake unit and an auxiliary brake unit until the travel speed is reduced to be less than a predetermined speed when the actual value of the vehicle exceeds the limit value.

19. The neutral travel control method of claim 14, further comprising:
   warning at least one of a driver of the vehicle and an exterior of the vehicle that the vehicle is travelling in neutral when the actual value of the vehicle exceeds the limit value.

20. The neutral travel control method of claim 14, wherein the neutral travel controlling further includes: comparing a travel speed with a low-speed allowable speed, wherein the low-speed allowable speed is a reference speed for determining whether the vehicle is travelling at low speed allowing neutral travel.

* * * * *